United States Patent
Kobayashi

(10) Patent No.: US 8,214,412 B2
(45) Date of Patent: Jul. 3, 2012

(54) PLAYLIST EDITING APPARATUS AND PLAYLIST EDITING METHOD

(75) Inventor: Hideto Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 12/531,998

(22) PCT Filed: Mar. 10, 2008

(86) PCT No.: PCT/JP2008/000518
§ 371 (c)(1),
(2), (4) Date: Sep. 18, 2009

(87) PCT Pub. No.: WO2008/114494
PCT Pub. Date: Sep. 25, 2008

(65) Prior Publication Data
US 2010/0115007 A1  May 6, 2010

(30) Foreign Application Priority Data

Mar. 22, 2007  (JP) ................ 2007-074180

(51) Int. Cl.
*G06F 17/30* (2006.01)

(52) U.S. Cl. .................................. 707/821

(58) Field of Classification Search .......... None
See application file for complete search history.

(56) References Cited

U.S. PATENT DOCUMENTS

| | | |
|---|---|---|
| 2005/0100308 A1 | 5/2005 | Moteki |
| 2005/0190659 A1 | 9/2005 | Shirakihara et al. |
| 2006/0182418 A1* | 8/2006 | Yamagata et al. ............. 386/95 |

FOREIGN PATENT DOCUMENTS

| | | |
|---|---|---|
| JP | 11-224478 A | 8/1999 |
| JP | 11-232257 A | 8/1999 |
| JP | 2002-245033 A | 8/2002 |
| JP | 2005/142853 A | 6/2005 |
| JP | 2005-285309 A | 10/2005 |
| JP | 2005-317076 A | 11/2005 |

* cited by examiner

*Primary Examiner* — Belinda Xue
(74) *Attorney, Agent, or Firm* — Hamre, Schumann, Mueller & Larson, P.C.

(57) ABSTRACT

A playlist editing apparatus includes a management unit 11 that manages a playlist, a playlist name input unit 12 for newly setting a playlist name, a determination unit 13 that determines whether conversion of a character code of a playlist name set for an existing playlist is required, based on a relationship with a character code of a set playlist name, a changing unit 14 that changes a character code flag of the existing playlist to a flag corresponding to a character code to be converted to, when it is determined that character code conversion is required, a character code conversion unit 15 that converts a character string targeted for conversion to a designated character code, in response to changing of the character code flag, and a playlist name setting unit 16 that sets the converted character string as the playlist name. This enables a playlist to be edited so that inconsistency in character codes throughout the playlist and the disk does not occur.

9 Claims, 9 Drawing Sheets

\# PLAYLIST EDITING APPARATUS AND PLAYLIST EDITING METHOD

TECHNICAL FIELD

The present invention relates to editing a playlist for managing AV data recorded on a large capacity recording medium such a hard disk or an optical disk, and more particularly to a playlist editing apparatus and a playlist editing method capable of updating character string information such as names set in a playlist with a suitable character code.

BACKGROUND ART

In recent years, video data editing apparatuses that record, playback and edit video data using an optical disk such as Digital Versatile Disk (DVD) and blu-ray disk (BD) or a hard disk as information recording media have become prevalent.

With the standards for DVD, BD and the like, a management information file for managing information on playback, names and the like is defined for video data on disk. For example, management information called a playlist is defined as a unit by which the user performs playback control on video data. A playlist is a unit for which the user implicitly expects playback to be performed continuously. An example of the simplest playlist is a series of video data (content) from the start to the end of recording.

A number of attributes are defined in a playlist. For example, with a playlist defined for DVD or BD, it is possible to set a name representing the playlist itself (hereinafter, playlist name), mark information designating arbitrary locations in the playlist, names representing the mark information (hereinafter, chapter names), and a character code flag indicating the character code with which the playlist name and chapter names are set (e.g., see Patent Document 1). As an example, the relationship between the disk configuration in the standards for BD or the like and the various attribute information in a playlist will be described using FIGS. 1 and 2.

FIG. 1 shows a state in which Playlist #1 (2[1]), Playlist #2 (2[2]), ..., Playlist #N (2[N]) are included on a disk 1. As shown, Playlist #1 (2[1]) holds a character code flag 3 and a playlist name 4 as attribute information, and includes a plurality of chapters, that is, Chapter #1 (5[1]), Chapter #2 (5[2]), ..., Chapter #M (5[M]). Chapter location information 6 and a chapter name 7 are set for each chapter.

FIG. 2 shows a relation between the configuration of a playlist 2 and the chapters in the playlist 2. The case where there are three chapters in the playlist 2 is given as an example. The playlist 2 is a unit of data in which attributes for managing video data 8 are managed. The attributes include a playlist name 4, a character code flag 3 indicating the character code of the character string of the playlist name, respective chapter location information 6 for the three chapters, and chapter names 7. In a single playlist, the standards require that the playlist name and the chapter names of the chapters included in the playlist all be set with the same character code. This character code is set in a character code flag serving as attribute information of the playlist.

The definitions of character codes in the standards for DVD or BD that can be set in the character code flag of a playlist are as follows. Note that a character code can be set per playlist with BD, whereas the setting of a character code per playlist is inhibited with DVD.

BD-RE Character Codes
0x01 Japanese character set for Service Information of Integrated Service Digital Broadcasting (ISDB) defined in Association of Radio Industries and Businesses (ARIB)
0x10 ASCII
0x11 ISO 8859-1
0x12 ISO 8859-2
0x13 ISO 8859-3
0x14 ISO 8859-4
0x15 ISO 8859-5
0x16 ISO 8859-6
0x17 ISO 8859-7
0x18 ISO 8859-8
0x19 ISO 8859-9
0x20 ISO/IEC 10646-1 (Unicode)
DVD-Video Recording Character Codes
0x00 ASCII
0x11 ISO 8859-1
0x12 Shift JIS
0x13 KS C 5601-1987
0x14 KS C 5700-1995
0x15 ISO 8859-2
0x16 ISO 8859-5
0x17 ISO 8859-6
0x18 ISO 8859-7
0x19 ISO 8859-15
0x1A GB18030
0x1B Big5
Patent Document 1: JP 11-232257 A

DISCLOSURE OF INVENTION

Problem to be Solved by the Invention

In the case of changing a playlist name 4 or a chapter name 7 of an existing playlist 2, the playlist name 4 or the chapter name 7 needs to be set with a character code that is in accordance with the character code flag 3 set in the playlist 2. However, in the case of trying to change the playlist name 4 or the chapter name 7 using a different character code with a conventional editing apparatus, the change could not be made due to the difference in character codes, and even if the change could be made, this would have been in violation of the standards. In other words, the problem is that the character code information of the different names would not be consistent with the character code flag 3 in the playlist 2.

Further, in the case of combining a plurality of playlists 2 set with different character code flags 3 to register it as one playlist, the playlist either could not be combined because of the difference in character code flags, or even if the playlists were combined, the character codes of the respective names in the combined playlist would not be consistent with the character code flag.

Depending on the playback apparatus, sometimes only the minimum required character codes are supported because of the costs involved in incorporating character fonts corresponding to all of the character codes in order to display playlist names and chapter names. In such cases, if a playlist name or a chapter name is set with an unsupported character code, the device may not be able to display the name, or a meaningless character string may be displayed.

An object of the present invention is to provide an apparatus capable of editing a playlist so that inconsistency in character codes throughout the playlist and the disk does not occur, by automatically converting the character codes of an existing character string as necessary, when changing a playlist name in a system that manages video data on a disk as a playlist.

A further object of the present invention is to provide an apparatus capable of editing a playlist so that inconsistency in character codes throughout the playlist and the disk does not occur, by automatically converting the character code of an existing character string as necessary, when changing a chapter name in a playlist.

A further object of the present invention is to provide an apparatus capable of editing a playlist so that inconsistency in character codes throughout the playlist and the disk does not occur, by automatically converting the character code of an existing character string as necessary, when combining a plurality of playlists.

A further object of the present invention is to provide an apparatus capable of editing a playlist so that the playlist name and chapter names are displayed correctly, even in the case where an application or a device performing playback/display only supports specific character codes.

A further object of the present invention is to provide a playlist editing method capable of editing a playlist in the manner described above.

Means for Solving Problem

A playlist editing apparatus and a playlist editing method of the present invention are for editing a playlist and are used in a system in which the playlist is defined as a unit for managing video data on a recording media disk, and the playlist defines attributes including a playlist name and a character code flag showing a character code of the playlist name.

The playlist editing apparatus of the present invention includes a management unit that manages information on the playlist corresponding to individual video data, a playlist name input unit for a user to newly set a playlist name for the playlist, a determination unit that determines whether character code conversion of the playlist name set for the playlist managed by the management unit is required, based on a relationship with a character code of the playlist name set with the playlist name input unit, a changing unit that changes the character code flag set for the playlist on which the determination was performed to a character code flag corresponding to a character code to be converted to, when it is determined by the determination unit that character code conversion is required, a character code conversion unit that converts a character string targeted for conversion to a designated character code, if the character code flag of the playlist is changed by the changing unit, and a playlist name setting unit that sets the character string converted by the character code conversion unit as the playlist name.

The playlist editing method of the present invention includes a playlist name setting step of a user newly setting a playlist name for the playlist, a playlist name determination step of determining whether character code conversion of the playlist name set for the playlist is required, based on a relationship with a character code of the playlist name set in the playlist name step, a changing step of changing the character code flag set in the playlist on which the determination was performed to a character code flag corresponding to a character code to be converted to, when it is determined in the determination step that character code conversion is required, a playlist name conversion step of converting a character code of the playlist name targeted for conversion, if the character code flag of the playlist is changed in the changing step, and a playlist name setting step of setting the character string converted in the character code conversion step as the playlist name.

Effects of the Invention

According to a playlist editing apparatus and a playlist editing method of the present invention, in the case where the character code of an input playlist differs from the character code of an existing playlist, a character code flag set for the playlist is changed, and the character string of the playlist name is converted as necessary to a character code that corresponds to the changed character code flag, thereby enabling a playlist to be edited so that no inconsistency in character codes throughout the playlist and the disk occurs.

DESCRIPTION OF REFERENCE NUMERALS

Figure 1:
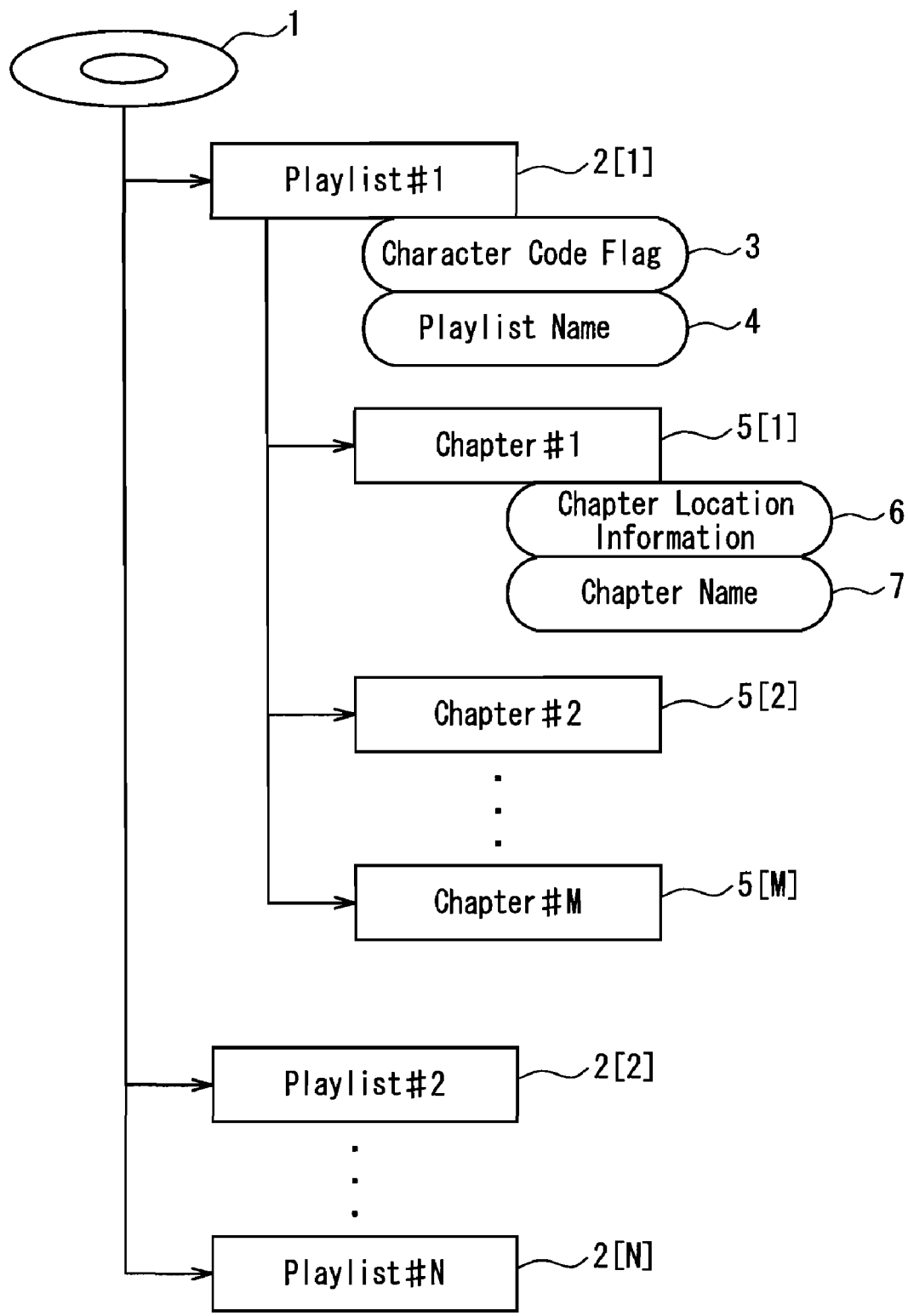
FIG. 1 represents the configuration of playlists on a disk.
Figure 2:
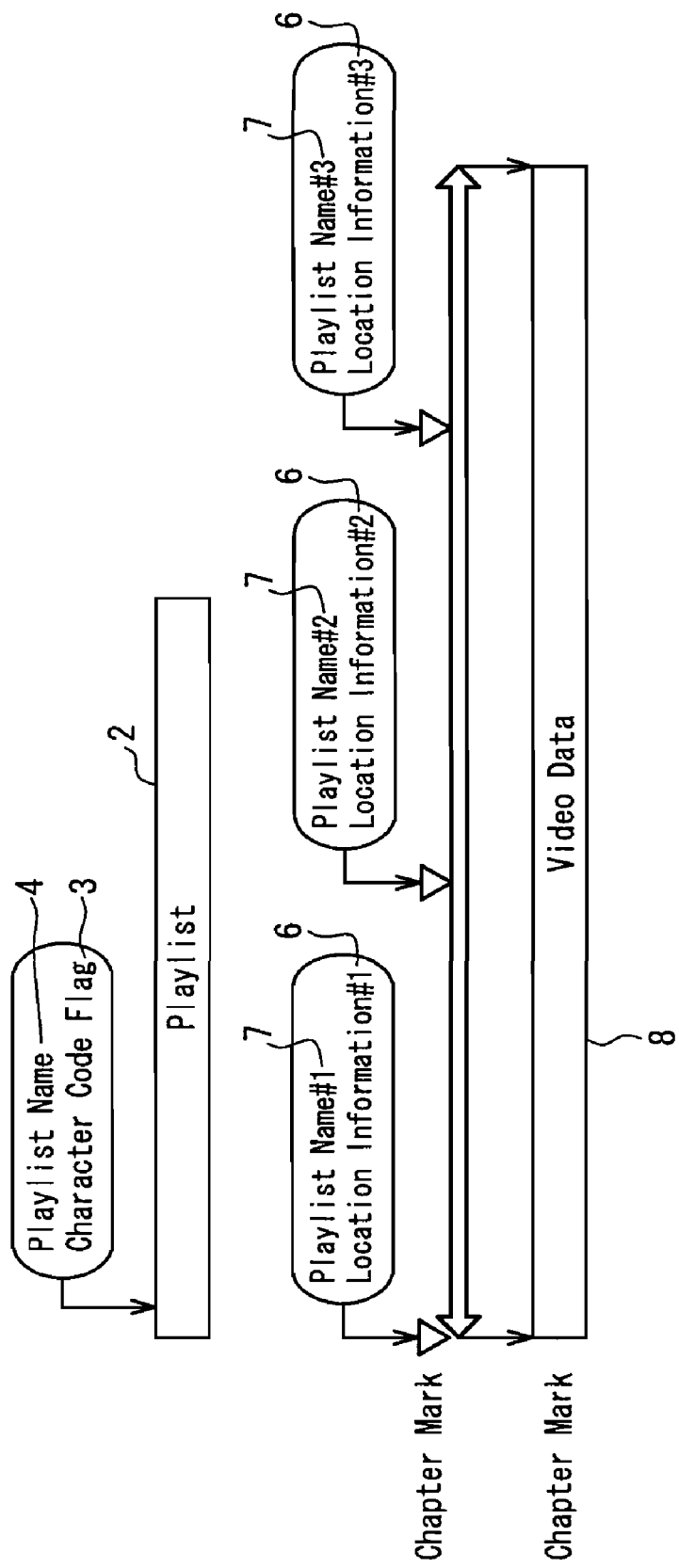
FIG. 2 represents a relation between the configuration of a playlist and chapters in the playlist.

1 Disk
2 Playlist
2[1] Playlist #1
2[2] Playlist #2
2[N] Playlist #N
3 Character Code Flag
4 Playlist Name
5[1] Chapter #1
5[2] Chapter #2
5[M] Chapter #M
6 Chapter Location Information
7 Chapter Name
8 Video Data
11 Management Unit
12 Playlist Name Input Unit
13 Determination Unit
14 Changing Unit
15 Character Code Conversion Unit
16 Playlist Name Setting Unit
17 Chapter Name Setting Unit
18 Specific Character Code Saving Unit
19 Specific Character Code Restoring Unit
20 Chapter Name Input Unit
21 Playlist Combining Unit
22 Character Code Setting Unit
30 Playlist Name Input Information
31 Character Code Information
32 Character Code Conversion Determination Information 33 Post-change Character Code Flag
34 Post-change Character Code Flag
35 Playlist Name Setting Command
36 Pre-change Playlist Name
37 Post-change Playlist Name
38 Set Playlist Name
39 Chapter Name Setting Command
40 Pre-change Chapter Name
41 Post-change Chapter Name
42 Set Chapter Name
43 Specific Character Code Character String
44 Saved Character String
45 Restored Character String
46 Chapter Name Input Information
47 Playlist Combining Information
48 Character Code Information

BEST MODE FOR CARRYING OUT THE INVENTION

The present invention is able to adopt the following forms, based on the above configurations.

That is, in the playlist editing apparatus constituted as described above, preferably the information on the playlist further includes attributes including chapter location information designating a location in the playlist, a chapter name corresponding to the chapter location information, and a character code flag showing a character code of the chapter name, and the playlist editing apparatus further includes a chapter name setting unit that sets the character string converted by the character code conversion unit as the chapter name of the chapter included in the playlist.

Preferably, the playlist editing apparatus further includes a specific character code saving unit that, in a case where a character code to be converted to corresponding to a pre-conversion character code of a character string does not exist in the character code conversion unit, temporarily saves the character string to a prescribed storage area for specific character string information, and a specific character code restoring unit that, if there is a character string saved in the specific character code saving unit when restoring a character string to an original character code with the character code conversion unit, performs character code conversion with reference to the saved character string.

Preferably, the playlist editing apparatus further includes a chapter name input unit for the user to newly set a chapter name for a chapter included in the playlist, and the determination unit determines whether conversion of the character code of the playlist name and the chapter name set for the playlist managed by the management unit is required, based on a relationship with a character code of the chapter name input with the chapter name input unit.

Preferably, the playlist editing apparatus further includes a playlist combining unit that combines a plurality of the playlists, and the determination unit determines whether conversion of the character code of the playlist name and the chapter name set for the playlist managed by the management unit is required, when a plurality of the playlists are to be combined by the playlist combining unit.

Preferably, the playlist editing apparatus further includes a character code setting unit that automatically sets a character code based on one of a designation of a character code by the user, a target device and an environment in which the playlist editing apparatus is operated, and the determination unit determines whether conversion of the character code of the playlist name and the chapter name set for the playlist managed by the management unit is required, when a character code is set by the character code setting unit.

In the playlist editing method constituted as described above, preferably the playlist further includes attributes including chapter location information designating a location in the playlist, a chapter name corresponding to the chapter location information, and a character code flag showing a character code of the chapter name, and the playlist editing method further includes a chapter name determination step of checking whether there remains a chapter name requiring character code conversion in the playlist, a chapter name conversion step of converting, if it is determined in the chapter name determination step that there remains a chapter name requiring character code conversion, a character code of the chapter name, and a chapter name setting step of setting the character string converted by the chapter name conversion step as the chapter name of the chapter.

Preferably, the playlist editing method further includes a convertibility determination step of determining whether there is a character that cannot be character code converted, when character code conversion is performed on a character string in the playlist name conversion step and the chapter name conversion step, a first character code conversion step of performing character code conversion on a character code convertible character, a save determination step of determining, if it is determined in the convertibility determination step that there is a character that cannot be character code converted, whether the character is a character saved in a prescribed storage area for specific character information, a saving step of saving, if it is determined in the save determination step not to be a character saved in the prescribed storage area, the character that cannot be character code converted to the prescribed storage area, a restoring step of restoring, if it is determined in the save determination step to be a character saved in the prescribed storage area, the character string saved in the prescribed storage area, and a second character code conversion step of performing character code conversion on a character other than the character restored in the restoring step.

Hereinafter, embodiments of the present invention will be described with reference to the drawings. Note that the same reference numerals in the drawings indicate the same constituent elements or similar actions or operations.

Embodiment 1

Figure 3:
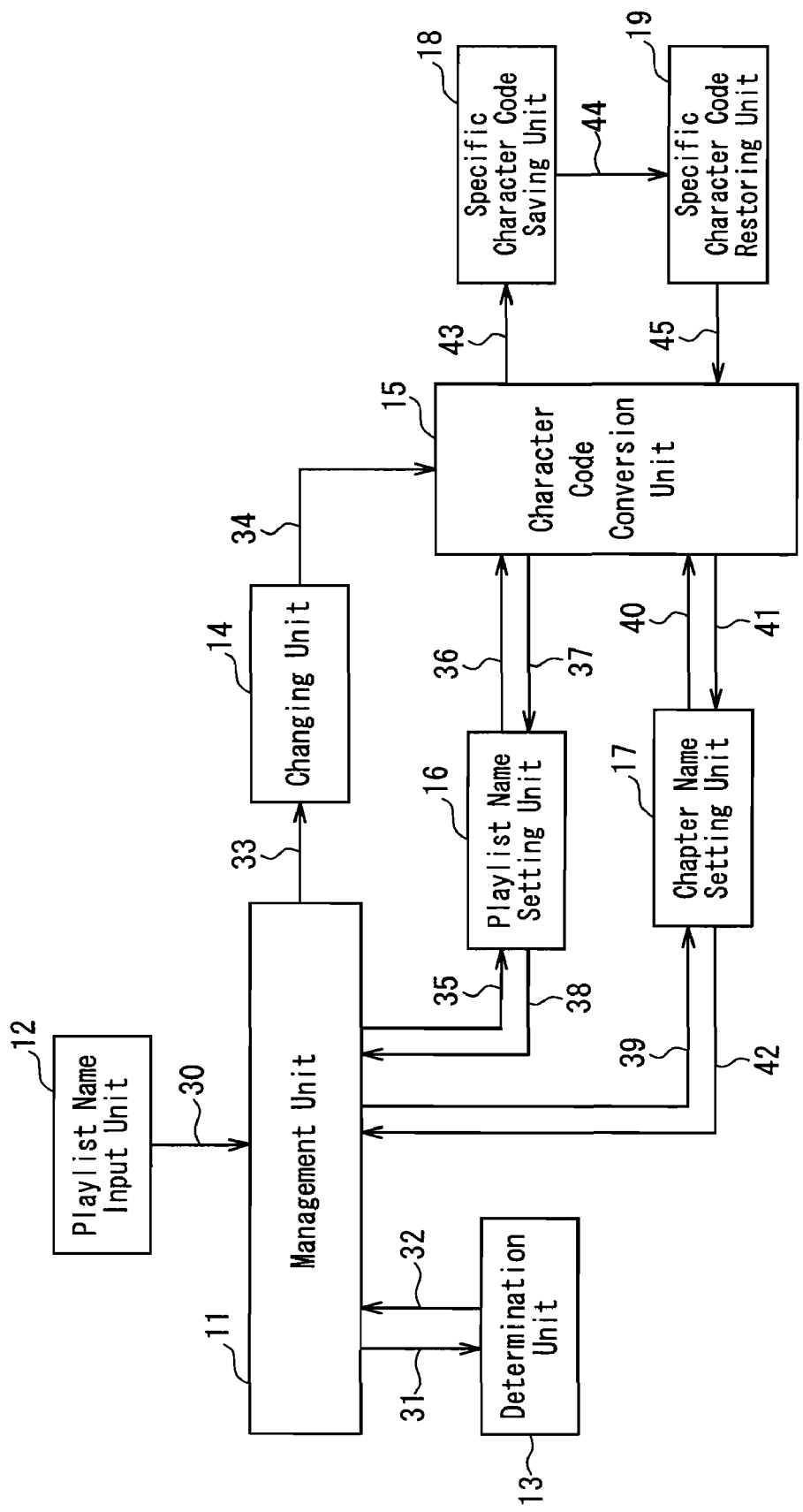
FIG. 3 is a block diagram showing a playlist editing apparatus in Embodiment 1 of the present invention.

FIG. 3 is a block diagram showing the configuration of a playlist editing apparatus and a playlist editing method in Embodiment 1 of the present invention. The configuration of this playlist editing apparatus corresponds to a function used when changing a playlist name, and includes a management unit 11, a playlist name input unit 12, a determination unit 13, a changing unit 14, a character code conversion unit 15, a playlist name setting unit 16, a chapter name setting unit 17, a specific character code saving unit 18, and a specific character code restoring unit 19. Except for the playlist name input unit 12, these elements are common to configurations related to the functions that will be shown in the other embodiments.

The constituent elements of this playlist editing apparatus will now be described. The management unit 11 manages information on all of the playlists on disk. The playlist name input unit 12 is provided so that an arbitrary character string can be input as a playlist name with an arbitrary character code as a result of a user operation. A character string input by a user is notified by the playlist name input unit 12 to the management unit 11 as playlist name input information 30 showing that the character string is to be set as a playlist name. The management unit 11 notifies character code information 31 of the character string designated as a playlist name to the determination unit 13 based on the playlist name input information 30. The determination unit 13 determines whether the character code shown in the character code information 31 differs from the character code of the existing playlist name, and notifies the result to the management unit 11 as character code conversion determination information 32.

If it is shown as the determination result that the character codes differ, based on the character code conversion determination information 32, the management unit 11 notifies a post-change character code flag 33 to the changing unit 14. The present embodiment may be configured such that a pre-change character code flag is notified together with the post-change character code flag 33. The changing unit 14, having received notification of the post-change character code flag 33, changes the character code flag set for the playlist, and notifies a post-change character code flag 34 to the character code conversion unit 15.

The management unit 11, having received character code conversion determination information 32 requiring change, also notifies a playlist name setting command 35 to the playlist name setting unit 16. The playlist name setting unit 16 notifies the playlist name designated by the management unit 11 to the character code conversion unit 15 as a pre-change playlist name 36. The character code conversion unit 15 converts the designated character string as necessary to a character code corresponding to the character code flag changed with the changing unit 14, and notifies a post-change playlist name 37 to the playlist name setting unit 16. The playlist name setting unit 16 sets the post-change playlist name 37 as a playlist name, and notifies a set playlist name 38 to the management unit 11.

The management unit 11 also notifies a chapter name setting command 39 to the chapter name setting unit 17. The chapter name setting command 39 includes a setting command for all chapter names. The chapter name setting unit 17 notifies the chapter names received from the management unit 11 to the character code conversion unit 15 as pre-change chapter names 40. The character code conversion unit 15 converts the designated character strings as necessary to a character code corresponding to the character code flag changed to by the changing unit 14, and notifies post-change chapter names 41 to the chapter name setting unit 17. The chapter name setting unit 17 sets the post-change chapter names 41 as chapter names, and notifies set chapter names 42 to the management unit 11.

There are cases where the character code conversion unit 15 is unable to perform character code conversion, that is, cases where a corresponding character code does not exist, depending on the pre- and post-conversion character code flags. The character code conversion unit 15 retains a specific character code table for collating character code flags that relates to character codes that cannot be converted. When it is evident with reference to the specific character code table that character code conversion is not possible, the character code conversion unit 15 notifies a specific character code character string 43 to the specific character code saving unit 18. The specific character code saving unit 18 temporarily saves the specified character string to a storage area for specific character string information.

Subsequently, when it is determined with reference to the specific character code table that a situation has arisen for reverting to the original character code, the character code conversion unit 15 notifies this fact to the specific character code saving unit 18. As for the character code flag, if there is a character string saved by the specific character code saving unit 18, the specific character code saving unit 18 notifies the specific character code restoring unit 19. The specific character code restoring unit 19 performs character code conversion with reference to a saved character string 44 received from the specific character code saving unit 18. The converted character string is supplied to the character code conversion unit 15 as a restored character string 45.

Next, the operations of the playlist editing apparatus and the playlist editing method of the present embodiment will be described with reference to FIG. 3.

Firstly, input of an arbitrary character string as a playlist name is performed with an arbitrary character code in the playlist name input unit 12 as a result of a user operation. Playlist name input information 30 based on this input is notified to the management unit 11. The management unit 11 notifies character code information 31 to the determination unit 13 based on the playlist name input information 30.

The determination unit 13, having received the character code information 31, determines whether the character code flag of the existing character string requires changing. If the character code flag does not require changing, the input character string is set as the playlist name by the playlist name setting unit 16 to complete the processing.

On the other hand, if it is determined in the determining unit 13 that the character code flag does require changing, the changing unit 14 changes the character code flag set for the playlist and notifies the character code conversion unit 15.

At the same time, the playlist name setting unit 16 notifies the pre-change playlist name 36 to the character code conversion unit 15 when setting the input character string as the playlist name. Given that the character code is, however, the same as the character code notified from the changing unit 14, the same character string is, as a result, returned from the character code conversion unit 15 as the post-change playlist name, and this character string is set as the playlist name. The chapter name setting unit 17 notifies pre-change chapter names 40 to the character code conversion unit 15 when resetting the existing chapter names. Since character strings whose character code has been converted are returned from the character code conversion unit 15 as post-change chapter names 41, the chapter name setting unit 17 sets these character strings as the chapter names.

There are cases, when performing character code conversion in the character code conversion unit 15, where a corresponding character code does not exist, depending on the pre- and post-conversion character code flags. In such cases, a specific character code character string 43 that cannot be character code converted is notified to the specific character code saving unit 18. This character string information is saved temporarily by the specific character code saving unit 18 to the storage area for specific character string information. Subsequently, if there is a character string saved by the specific character code saving unit 18 when a situation arises for performing conversion on a character string corresponding to the original character code flag in the character code conversion unit 15, the specific character code restoring unit 19 performs character code conversion with reference to the saved character string 44 and returns a restored character string 45 to the character code conversion unit 15.

According to Embodiment 1 as described above, in the case where a character string with a different character code to the character code set for the existing playlist is input as a playlist name, the character code flag is changed automatically to a character code flag corresponding to the input character code. In addition, the character codes of all chapter names included in the playlist are changed automatically to the same character code as the playlist name, maintaining consistency throughout the playlist.

Embodiment 2

Figure 4:
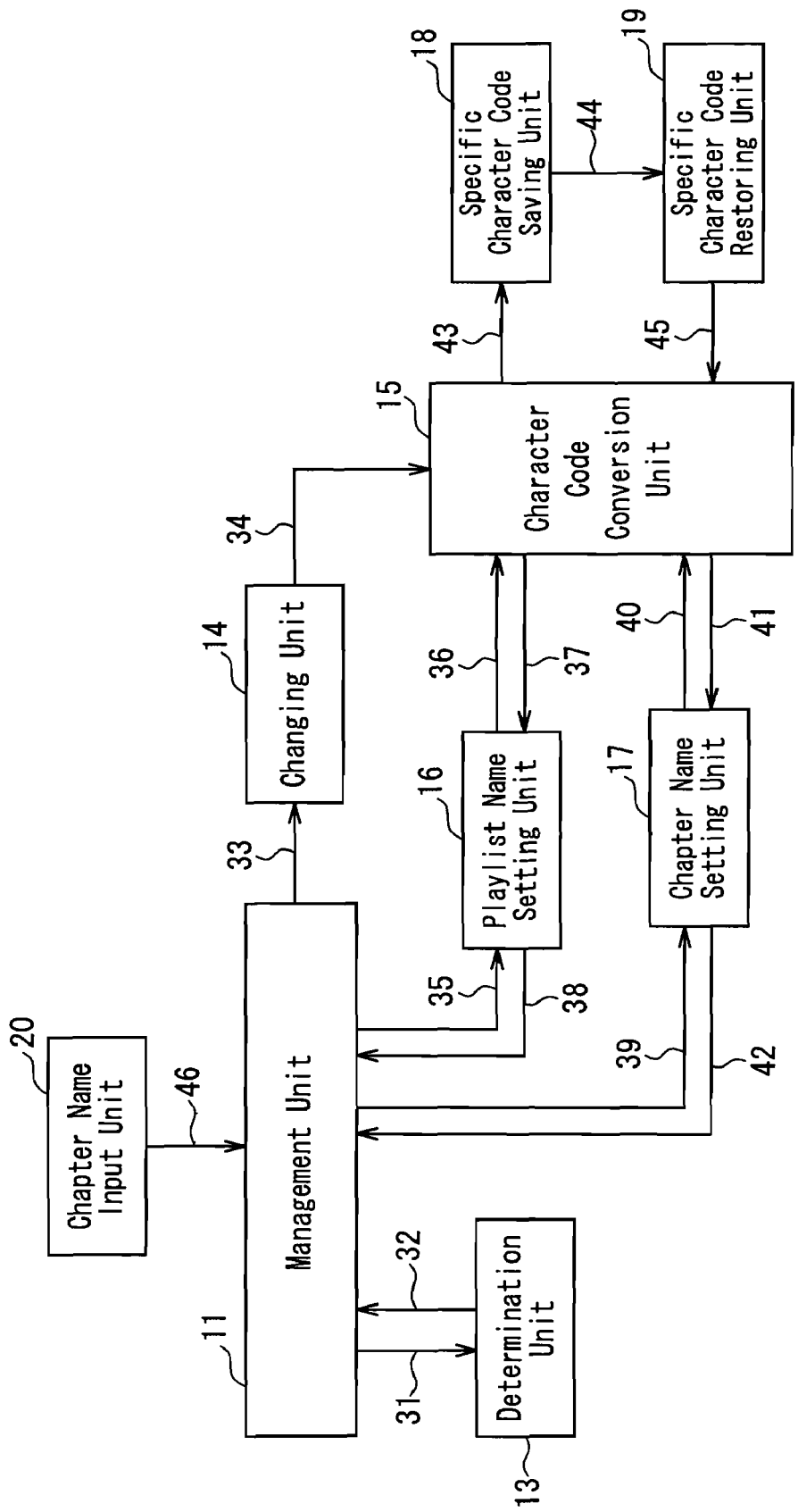
FIG. 4 is a block diagram showing a playlist editing apparatus in Embodiment 2 of the present invention.

FIG. 4 is a block diagram showing the configuration of a playlist editing apparatus and a playlist editing method in Embodiment 2 of the present invention. In FIG. 4, the same reference numerals are attached to elements that are the same as the constituent elements of the apparatus in Embodiment 1 shown in FIG. 3, and the redundant description will be abbreviated.

The configuration of the present embodiment corresponds to a function used when inputting and changing chapter names, and includes a chapter name input unit 20. Chapter name input information 46 is notified from the chapter name input unit 20 to the management unit 11. The chapter name input unit 20 is provided for the user to input arbitrary chapter names in a playlist. Note that in the display of FIG. 4, the chapter name input unit 20 is provided instead of the playlist name input unit 12 in FIG. 3, although the chapter name input unit 20 can be added to the configuration of Embodiment 1.

Next, the operations of the playlist editing apparatus according to Embodiment 2 constituted as described above and the playlist editing method will be described with reference to FIG. 4.

The chapter name input unit 20 inputs an arbitrary character string as a character name of an arbitrary chapter in a playlist with an arbitrary character code as a result of a user operation. Chapter name input information 46 based on this input is notified to the management unit 11. The management unit 11 notifies character code information 31 to the determination unit 13 based on the chapter name input information 46.

The determination unit 13, having received the character code information 31, compares the character code of the existing character string with the character code of the designated character string. The determination unit 13 thereby determines whether the character code flag of the existing character string requires changing. If the character code flag does not require changing, the input character string is set as the chapter name of the corresponding chapter by the chapter name setting unit 17 to complete the processing.

On the other hand, if it is determined by the determination unit 13 that the character code flag does require changing, a post-change character code flag 33 is notified to the changing unit 14, a playlist name setting command 35 is notified to the playlist name setting unit 16, and a chapter name setting command 39 is notified to the chapter name setting unit 17.

The changing unit 14 changes the character code flag set in the playlist and notifies the character code conversion unit 15. The playlist name setting unit 16 notifies the pre-change playlist name 36 to the character code conversion unit 15 when resetting the existing playlist name. Since a character code-converted character string is returned from the character code conversion unit 15 as a post-change playlist name 37, the playlist name setting unit 16 sets this character string as the playlist name.

The chapter name setting unit 17 notifies the pre-change chapter name 40 to the character code conversion unit 15 when resetting the existing chapter. Since a character code-converted character string is returned from the character code conversion unit 15 as a post-change chapter name 41, the chapter name setting unit 17 sets this character string as the chapter name. With regard to the chapter name of the chapter input with the chapter name input unit 20, however, the same result is returned even if character code conversion is performed by the character code conversion unit 15, so this character string is set as the chapter name of the corresponding chapter.

Since the remaining operations and processes are the same as those described in Embodiment 1, the detailed description thereof will be omitted.

According to Embodiment 2 as described above, in the case where a character string with a different character code from the character code set in the existing playlist is input as a chapter name, the character code flag is changed automatically to a character code flag corresponding to the input character code. In addition, the character codes of the playlist name and all chapter names included in the playlist are automatically changed to the same character code, maintaining consistency throughout the playlist.

Embodiment 3

Figure 5:
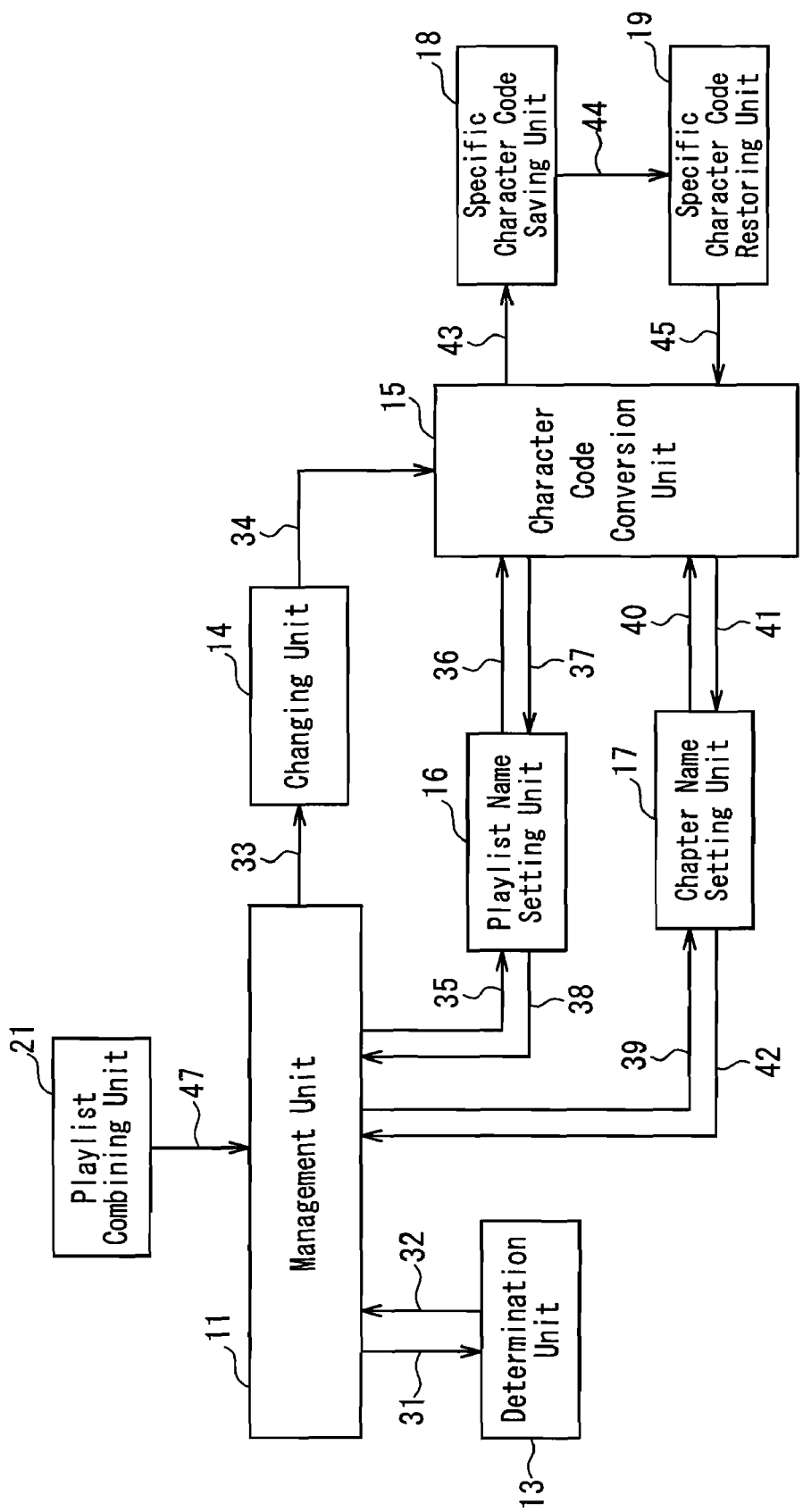
FIG. 5 is a block diagram showing a playlist editing apparatus in Embodiment 3 of the present invention.

FIG. 5 is a block diagram showing the configuration of a playlist editing apparatus and a playlist editing method in Embodiment 3 of the present invention. In FIG. 5, the same reference numerals are attached to elements that are the same as the constituent elements of the apparatus in Embodiment 1 shown in FIG. 3, and the redundant description will be abbreviated.

The configuration of the present embodiment corresponds to a function for when combining a plurality of playlists, and includes a playlist combining unit 21. Playlist combining information 47 is notified from the playlist combining unit 21 to the management unit 11. The playlist combining unit 21 is provided in order to combine two or more designated playlists. Note that in the display of FIG. 5, the playlist combining unit 21 is provided instead of the playlist name input unit 12 in FIG. 3, although the playlist combining unit 21 can be added to Embodiment 1 or 2, or to a configuration combining Embodiments 1 and 2.

Next, the configuration of the playlist editing apparatus according to Embodiment 3 constituted as described above and the playlist editing method will be described with reference to FIG. 5.

With the playlist combining unit 21, two or more playlists to be combined are designated as a result of a user operation, and the playlists are combined newly to create a single playlist. At this time, playlist combining information 47 is notified to the management unit 11 managing the playlists as a whole. Here, the playlist forming the basis of the combining will be referred to as the base playlist, and a playlist (one or a plurality) to be combined with the base playlist will be referred to as a combining playlist. The base playlist and the combining playlist are specified with the playlist combining information 47.

The management unit 11 notifies the character code of the combining playlist to the determination unit 13 as character code information 31 based on the playlist combining information 47. The determination unit 13, having received the character code information 31, compares the character code of the base playlist with the character code of the combining playlist. The determination unit 13 thereby determines whether the character code flag of the existing character string requires changing. If the character code flag does not need changing, the playlist combining process is completed with the character codes of the various character strings remaining unchanged.

On the other hand, if it is determined by the determination unit 13 that the character code flag requires changing, character code conversion is performed with a similar procedure to Embodiment 1 prior to combining the playlists, in order to align the character code of the playlist name and chapter names of the combining playlist with the character code of the base playlist. The playlist combining process is completed after completion of character code conversion on all of the playlists. Since the other operations are similar procedures to the processing described in Embodiment 1, the detailed description will be omitted.

Figure 6:
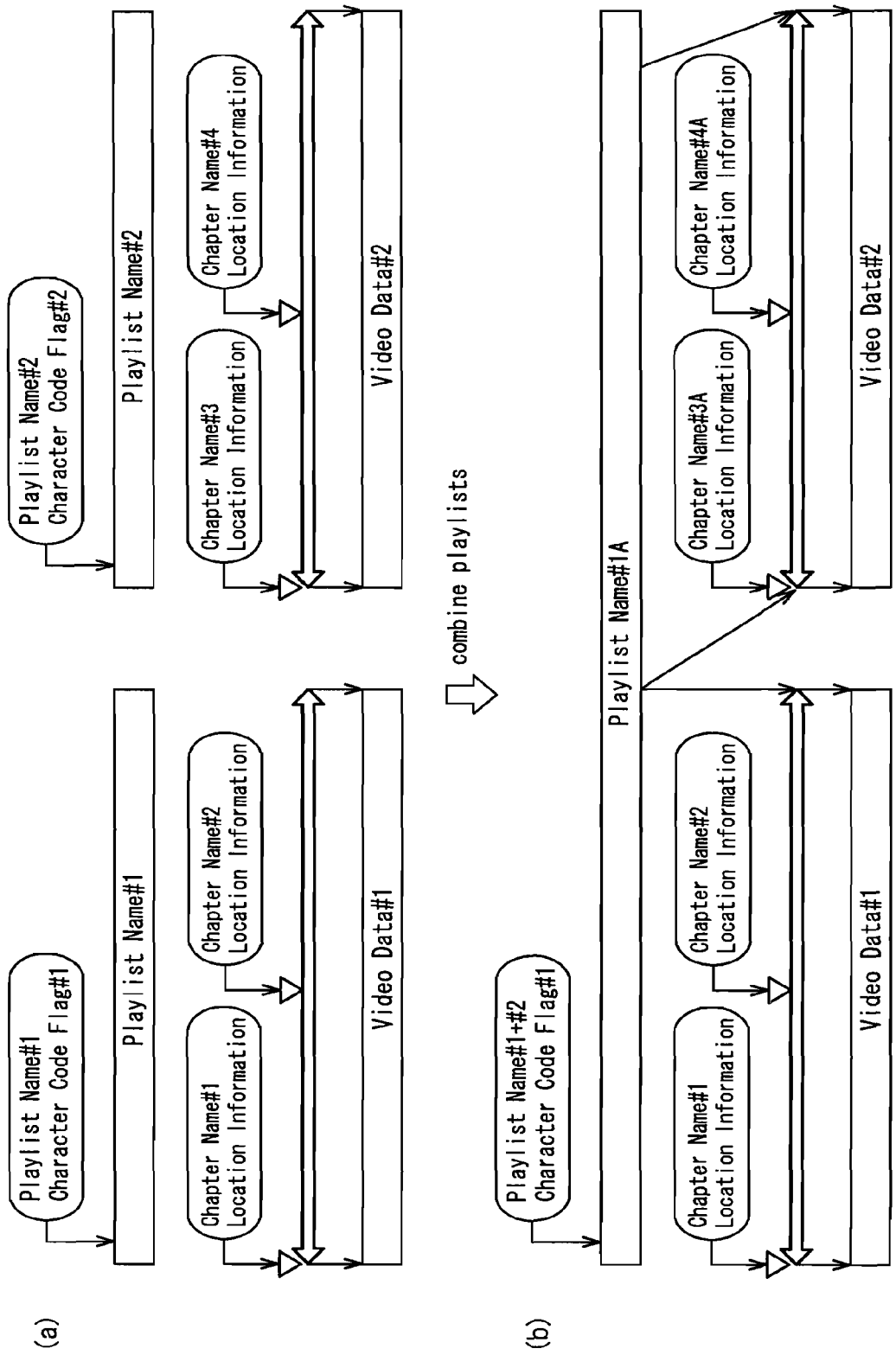
FIG. 6 is a block diagram showing an exemplary operation for when combining playlists in the same Embodiment.

FIG. 6 shows the change in the configuration of data before and after combining in the case where two playlists are combined as a result of the above operation. Playlist #1A shown in FIG. 6 (b) is newly constituted from Playlist #1 and Playlist #2 shown in FIG. 6 (a) as a result of combining the playlists. At this time, processing is performed with Playlist #1 as the base playlist and Playlist #2 as the combining playlist.

A new playlist name is set for the combined Playlist #1A. The new playlist name may be set automatically by the system. For example, if the name of Playlist #1 is "Program 1" and the name of Playlist #2 is "Program 2", the post-combining program name automatically will be set to "Program 1+Program 2". The present embodiment may be configured so that the operator inputs the post-combining playlist name. Further, the chapter names #3 and #4 respectively change to chapter names #3A and #4A with character code conversion, and are registered as chapters of the combined Playlist #1A. Consistency in the combined playlist is thus maintained by also performing character code conversion when combining playlists.

According to Embodiment 3 as described above, when combining a plurality of playlists, consistency throughout the combined playlist can be maintained even in the case where the character code flags set for the respective playlists differ, by performing character code conversion before combining the playlists.

Embodiment 4

Figure 7:
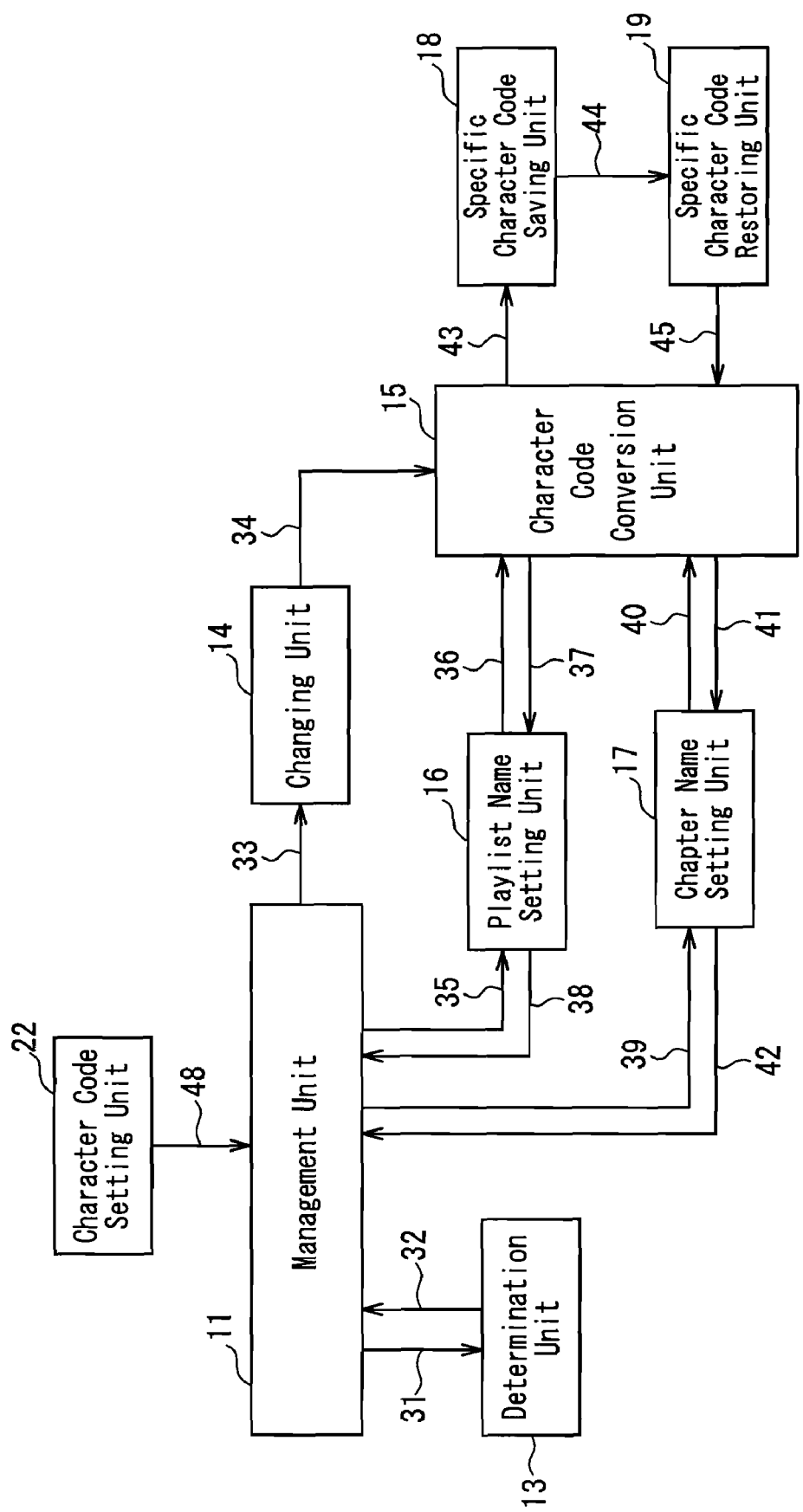
FIG. 7 is a block diagram showing a playlist editing apparatus in Embodiment 4 of the present invention.

FIG. 7 is a block diagram showing the configuration of a playlist editing apparatus and a playlist editing method in Embodiment 4 of the present invention. In FIG. 7, the same reference numerals are attached to elements that are the same as the constituent elements of the apparatus in Embodiment 1 shown in FIG. 3, and the redundant description will be abbreviated.

In the configuration of the present embodiment, a character code setting unit 22 is provided, and character code information 48 is notified from the character code setting unit 22 to the management unit 11. The character code setting unit 22 is provided in order to set automatically a character code according to an environment designated by a user or an environment in which the apparatus is used. Note that in the display of FIG. 7, the character code setting unit 22 is provided instead of the playlist name input unit 12 in FIG. 3, although the character code setting unit 22 can be added to any of Embodiments 1 to 3, or to a configuration appropriately combining Embodiments 1 to 3.

Next, the operations of the playlist editing apparatus according to Embodiment 4 constituted as described above, and the playlist editing method will be described with reference to FIG. 7.

With the character code setting unit 22, a language code that is decided automatically depending on a designation of a character code by a user operation, the device being used, or an environment in which the device is used is designated. This character code information 48 is notified to the management unit 11 managing the playlists as a whole. The management unit 11 notifies character code information 31 to the determination unit 13 based on the character code information 48 notified from the character code setting unit 22.

The determination unit 13, having received the character code information 31, compares the character codes of all of the playlists with the designated character code. The determination unit 13 thereby determines for each playlist whether the character code flag requires changing. The processing is ended for playlists whose character code flag does not require changing.

On the other hand, the character codes of the playlist name and the chapter names are converted for playlists for which it is determined that the character code flag does require changing. Since the processing at this time is performed with a similar procedure to the processing described in Embodiment 1, detailed description will be omitted.

According to Embodiment 4 as described above, playlist names and chapter names can be displayed correctly even if used with another device (application) whose disk only supports specific character codes, by converting the character codes of all playlists to a designated character code.

Embodiment 5

Figure 8:
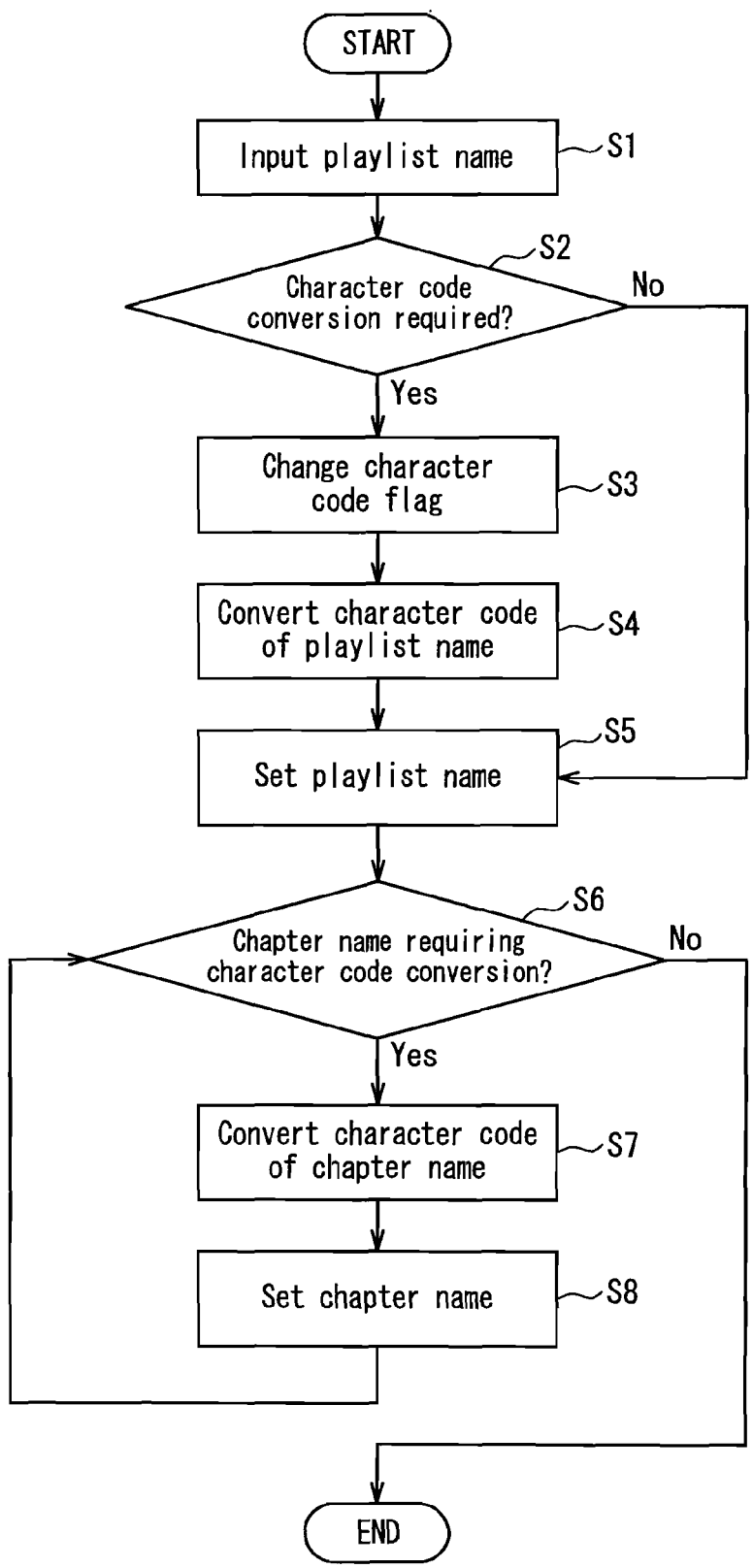
FIG. 8 is a flowchart showing a playlist editing method in Embodiment 5 of the present invention.

Next, a playlist editing method in Embodiment 5 will be described with reference to FIG. 8. This editing method corresponds to Embodiment 1, although only the procedures of the editing method will be shown.

When playlist editing is started, firstly, a playlist name is input with an arbitrary character code using an arbitrary character string (step S1). Next, the character code of the input character string is compared with the character code of the existing character string, and it is determined whether character code conversion of the existing character string is required (step S2). If it is determined that character code conversion is required, the character code flag set in the playlist is changed (step S3). Next, after converting the character code of the playlist name (step S4), the character string input in step S1 is set as the playlist name of the playlist (step S5).

If, in step S2, it is determined that character code conversion is not required, the processing proceeds directly to step S5, where the input character string is set as the playlist name.

After step S5 had ended, the processing proceeds to step S6, where the character codes of the existing chapter names are compared with the character code of the character string of the input playlist name, and it is determined whether character code conversion is required. If there is a chapter name for which it is determined that character code conversion is required, the processing proceeds to step S7, where the character code of the corresponding chapter name is converted, and the converted character string is set as the chapter name (step S8). Next, the processing returns to step S6, where comparison with the character code of the character string of the input playlist name is performed for another existing chapter name, and it is determined whether character code conversion is required, with the processing of steps S7 and S8 being repeated as necessary.

If, in step S6, a state is reached where there are no chapter names for which it is determined that character code conversion is required, the processing is ended. Thus, if a character string with a different character code to the character code set in the existing playlist is input as a playlist name, the character code flag is changed automatically to a character code flag corresponding to the input character code. In addition, the character codes of all chapter names included in the playlist are also automatically converted to the same character code as the playlist name, maintaining consistency throughout the playlist.

Figure 9:
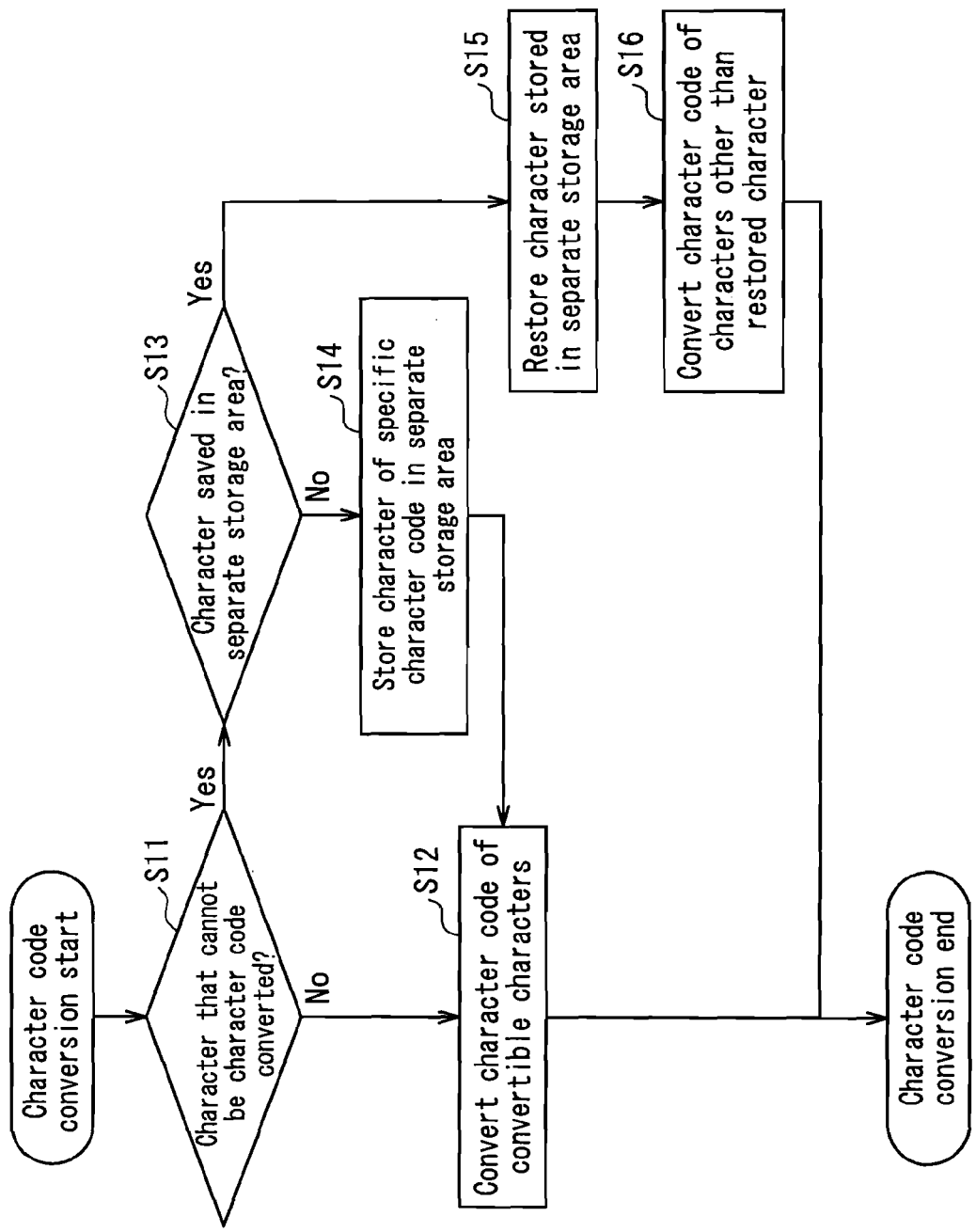
FIG. 9 is a flowchart showing an exemplary character code conversion operation of the playlist editing method in Embodiment 5.

Next, an example of the character code conversion operation used in the above embodiment of the playlist editing method will be described with reference to FIG. 9.

When character code conversion is started, firstly, it is determined whether there is a character that cannot be character code converted (step S11). If there is not a character that cannot be character code converted, the processing proceeds to step S12, where the character code is converted, and the character code conversion is ended.

If, in step S11, there is a character determined as a character that cannot be character code converted, the processing proceeds to step S13, where it is determined whether the character is a character saved in the storage area for specific character string information. If not a character saved in the storage area for specific character string information, the processing proceeds to step S14, and the character is stored in the storage area for specific character string information as a specific character code character. Next, the processing proceeds to step S12, where character code conversion is performed on convertible characters, and the character code conversion is ended.

If, in step S13, it is determined that the character determined as a character that cannot be character code converted is a character saved in the storage area for specific character string information, the processing proceeds to step S15, where the character stored in the storage area is restored. Subsequently, the processing proceeds to step S16, where character code conversion is performed on characters other than the restored character (step S16), and the character code conversion is ended.

Note that the procedures for changing a character code flag or converting the character code of a playlist name or a chapter name can be performed similarly to the above in relation to the playlist editing apparatuses and playlist editing methods of Embodiments 2 to 4.

The present invention may be realized as a computer program. This program can be distributed via a telecommunications line, a recording medium or the like, and the present invention also can be implemented using a computer.

While the present invention has been described in detail above using preferred embodiments, the present invention is not limited to these embodiments. It will be obvious to those stilled in the art that preferred variations and modifications are available within the technical scope of the present invention as described in the claims.

INDUSTRIAL APPLICABILITY

A playlist editing apparatus and a playlist editing method according to the present invention enable consistency throughout a playlist to be easily maintained with regard to character codes used, and are useful in editing playlists defined for DVD and BD.

The invention claimed is:

1. A playlist editing apparatus for editing a playlist and that is used in a system in which the playlist is defined as a unit for managing video data on a recording media disk, the apparatus comprising:
   a computing device;
   a management unit that manages information on the playlist corresponding to individual video data, wherein the playlist defines attributes including a playlist name and a character code flag showing a character code of the playlist name;
   a playlist name input unit for a user to newly set a playlist name for the playlist;
   a determination unit that determines whether character code conversion of the newly set playlist name for the playlist managed by the management unit is required, based on a relationship with a character code of the newly set playlist name with the playlist name input unit;
   a changing unit that changes the character code flag being set for the playlist on which the determination was performed to the character code flag corresponding to the character code to be converted to, when the determination unit determines that character code conversion is required;
   a character code conversion unit that converts a character string targeted for conversion to a designated character code, when the character code flag of the playlist is changed by the changing unit; and
   a playlist name setting unit that sets the character string that has been character code-converted by the character code conversion unit as the playlist name.

2. The playlist editing apparatus according to claim 1, wherein
   the information on the playlist further includes attributes including chapter location information designating a location in the playlist, a chapter name corresponding to the chapter location information, and a character code flag showing a character code of the chapter name, and
   the playlist editing apparatus further comprises a chapter name setting unit that sets the character string that has been character code-converted by the character code conversion unit as the chapter name of the chapter included in the playlist.

3. The playlist editing apparatus according to claim 1, further comprising:
   a specific character code saving unit that, in a case where a character code to be converted to corresponding to a pre-conversion character code of the character string targeted for conversion does not exist in the character code conversion unit, temporarily saves the character string targeted for conversion to a prescribed storage area for specific character string information; and
   a specific character code restoring unit that, when there is the character string saved in the specific character code saving unit when restoring the character string set as the playlist name to an original character code with the character code conversion unit, performs character code conversion with reference to the saved character string.

4. The playlist editing apparatus according to claim 2, further comprising a chapter name input unit for the user to set a new chapter name for a chapter included in the playlist, wherein
   the determination unit determines whether conversion of the character code of the playlist name and the new chapter name set for the playlist managed by the management unit is required, based on a relation with a character code of the new chapter name input with the chapter name input unit.

5. The playlist editing apparatus according to claim 2, further comprising a playlist combining unit that combines a plurality of the playlists, wherein
   the determination unit determines whether conversion of the character code of the playlist name and the chapter name set for the playlist managed by the management unit is required, when a plurality of the playlists are to be combined by the playlist combining unit.

6. The playlist editing apparatus according to claim 2, further comprising a character code setting unit that automatically sets a character code based on one of a designation of a character code by the user, a target device and an environment in which the playlist editing apparatus is operated, wherein the determination unit determines whether conversion of the character code of the playlist name and the chapter name set for the playlist managed by the management unit is required, when a character code is set by the character code setting unit.

7. A playlist editing method for editing a playlist and that is used in a system in which the playlist is defined as a unit for managing video data on a recording media disk, the method comprising:

a playlist name setting step of a user newly setting a playlist name for the playlist, wherein the playlist defines attributes including a playlist name and a character code flag showing a character code of the playlist name;

a playlist name determination step of determining whether character code conversion of the newly set playlist name for the playlist is required, based on a relationship with a character code of the newly set playlist name in the playlist name setting step;

a changing step of changing the character code flag being set in the playlist on which the determination was performed to the character code flag corresponding to the character code to be converted to, when that character code conversion is required is determined in the determination step;

a playlist name conversion step of converting a character code of the playlist name targeted for conversion, when the character code flag of the playlist is changed in the changing step; and a playlist name setting step of setting a character string converted in the playlist name conversion step as the playlist name.

8. The playlist editing method according to claim 7, wherein the playlist further includes attributes including chapter location information designating a location in the playlist, a chapter name corresponding to the chapter location information, and a character code flag showing a character code of the chapter name, and the playlist editing method further comprises:

a chapter name determination step of checking whether there remains a chapter name requiring character code conversion in the playlist;

a chapter name conversion step of converting a character code of the chapter name, when a chapter name remaining requiring character code conversion is determined in the chapter name determination step; and a chapter name setting step of setting a character string converted by the chapter name conversion step as the chapter name of the chapter.

9. The playlist editing method according to claim 8, further comprising:

a convertibility determination step of determining whether there is a character that cannot be character code converted, when character code conversion is performed on the character string in the playlist name conversion step and the chapter name conversion step;

a first character code conversion step of performing character code conversion on a character code-convertible character;

a save determination step of determining whether the character is a character saved in a prescribed storage area for specific character information, when a character being character code nonconvertible is determined in the convertibility determination step;

a saving step of saving the character that is character code nonconvertible to the prescribed storage area, when the character is determined not to be a character saved in the prescribed storage area in the save determination step;

a restoring step of restoring the character string saved in the prescribed storage area by the saving step, when the character is determined to be a character saved in the prescribed storage area in the save determination step; and a second character code conversion step of performing character code conversion on a character other than the character restored in the restoring step.

* * * * *